United States Patent [19]

Rahn et al.

[11] Patent Number: 4,556,390

[45] Date of Patent: Dec. 3, 1985

[54] ADULT/CHILD COMMUNICATION KIT

[75] Inventors: Melanie H. Rahn; Jane E. Braun, both of Chandler, Ariz.

[73] Assignee: Dorothy Laporte, Phoenix, Ariz. ; a part interest

[21] Appl. No.: 624,472

[22] Filed: Jun. 25, 1984

[51] Int. Cl.⁴ ....................... G09B 29/00; B42D 15/00

[52] U.S. Cl. .................................. 434/433; 283/1 A; 283/1 B; 283/48 R

[58] Field of Search ............... 434/433, 156, 162, 112, 434/165, 117, 236, 238; 283/1 R, 1 A, 1 B, 2, 48 R, 48 A, 51

[56] References Cited

U.S. PATENT DOCUMENTS 1,181,970 5/1916 Kratz .................................. 283/1 B 2,862,309 12/1958 Von Der Hellen ................ 434/156

*Primary Examiner*—William H. Grieb

*Attorney, Agent, or Firm*—Jordan M. Meschkow

[57] ABSTRACT

A communication kit for organizing and encouraging postal communications between an adult (e.g., divorced parent) and a child includes a plurality of sets of stationery, each set tailored to a specific month of the year. Each set includes a calendar for the month, two letters, two small returnable post cards, two envelopes, one special project and two large post cards. During the first and third weeks of each month, the adult sends a letter and a small returnable post card to the child. During the first week, the child is also sent a calendar on which the adult has marked important days. During the third week, the child is also sent a special project which he or she may color, cut out, assemble, etc. During the second and fourth weeks of each month the adult sends large post cards to the child.

23 Claims, 9 Drawing Figures

ADULT/CHILD COMMUNICATION KIT

BACKGROUND OF THE INVENTION

This invention relates generally to stationery and, more particularly, to a communication kit which provides for weekly postal communication between an adult and a child.

It is well known that there are millions of adults residing in the United States who are either divorced or separated. Unfortunately, this often means that one parent is forced to live apart from his or her child or children, and millions of children now live in one-parent homes. As a result, there is often insufficient communication between the children and the non-resident parents due to the lack of a systematic and convenient method of accomplishing such communications thereby preventing deterioration of the parent/child relationship.

Such a method would not only be applicable to a non-resident parent, but would be very useful to any adult who wishes to establish or maintain a relationship with a special child when it is not possible to be with that child. Thus, a systematic and convenient method of maintaining a relationship with a child through the mail system would also be useful to grandparents, aunts, uncles, godparents, etc.

SUMMARY OF THE INVENTION

It is an object of the present invention to provide a communication kit which includes substantially everything needed by an adult to maintain weekly mail contact with a child (typically three to ten years old).

It is a further object of the invention to provide a communication kit designed to encourage regular weekly mail contact between an adult and a child without consuming a great deal of time.

It is a still further object of the present invention to provide a communciation kit designed to encourage a child to communicate by mail with an adult not living with the child.

Yet another object of the present invention is to provide a communication kit designed to encourage regular mail contact between an adult and a child, the kit being compactly packaged so as to fit in, for example, a briefcase.

A still further object of the present invention is to provide a kit which organizes communications between an adult and child who do not live together.

Yet another object of the present invention is to provide a communication kit designed for weekly mail contact between an adult and child, the kit enabling easy and efficient writing on the part of the adult.

According to a broad aspect of the invention there is provided a communication kit for organizing and encouraging postal communications between an adult and a child, the communication kit including a plurality of sets of stationery each set tailored to a particular month and comprising a first plurality of items of stationery to be sent by the adult to the child at a first time of the particular month, at least a first item of stationery to be sent by the adult to the child at a second later time of the particular month, a second plurality of items of stationery to be sent by the adult to the child at a third still later time of the particular month, and at least a second item of stationery to be sent by the adult to the child at a fourth still later time of the month.

According to a further aspect of the invention there is provided a communication kit for organizing and encouraging postal communications between an adult and a child which comprises a plurality of sets of stationery each tailored to a particular month and a chart for keeping track of the communications between the adult and child.

The above and other objects, features and advantages of the present invention will be better understood from the following detailed description taken in conjunction with the accompanying drawings, in which:

DESCRIPTION OF THE PREFERRED EMBODIMENT

The inventive communication kit includes one hundred and twenty pieces of stationery. That is, for each month there are provided two letters, one calendar, one special project, two large post cards, two small returnable post cards, two envelopes, and two stickers.

The kit also includes a calendar for each month of the year upon which the adult can indicate the important days of that month. These days might consist of birthdays, days on which the adult and child will see each other, days on which the adult will be calling the child, etc. This will assure that the child has days to look forward to and permits the child to mark off the days.

During the first week of each month, it is suggested that the adult send to the child the first letter, the first returnable post card, the calendar for that particular month, and the first sticker all in a single envelope. The first large post card should be sent during the second week of the month, and during the third week the adult should send to the child the second letter, the special project, the second returnable post card and the second sticker all again in a single envelope. Finally, the second large post card should be sent during the fourth week. It is suggested that in each case, the items be mailed such that they are received by the child during the middle of the week when the child's schedule is likely to be more consistent.

All of the stationery in the kit may be housed in, for example, a tri-fold presentation vinyl folder which includes clear vinyl pockets which hold each month's stationery. Additional pockets are provided to hold a guide book which explains each aspect of the kit, photographs, etc. The folder is sufficiently compact to be carried in a briefcase or easily stored when not in use.

Figure 1:
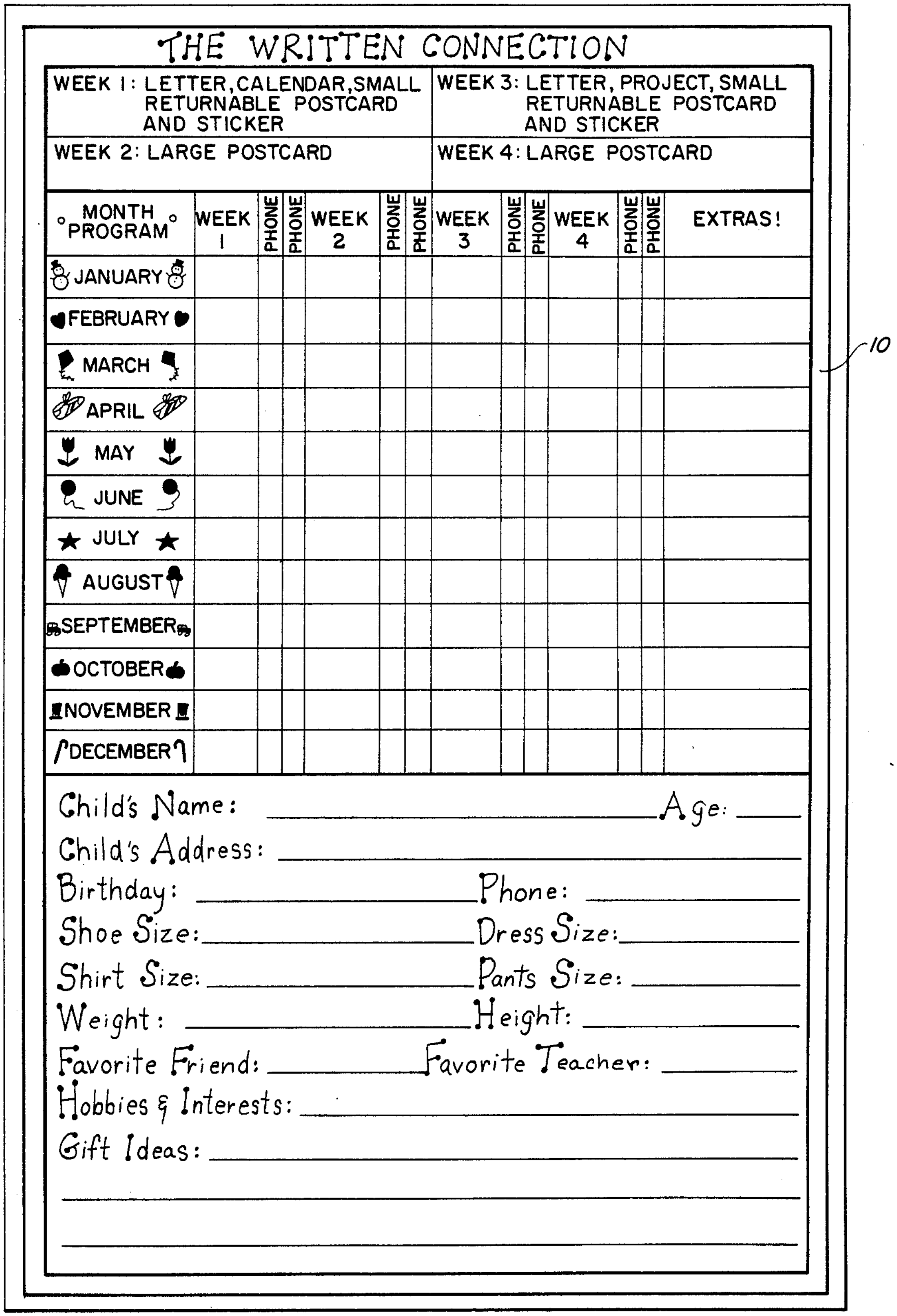
FIG. 1 illustrates a chart included in the inventive communication kit which may be used by the adult to keep track of written and telephone communications.

The kit includes a chart 10 shown in FIG. 1 which may be used by the adult to keep track of written and telephone communications. As can be seen, the chart includes an information area where pertinent facts such as birthday, clothing sizes, height, weight, etc. may be recorded for ready reference by the adult.

Figure 2:
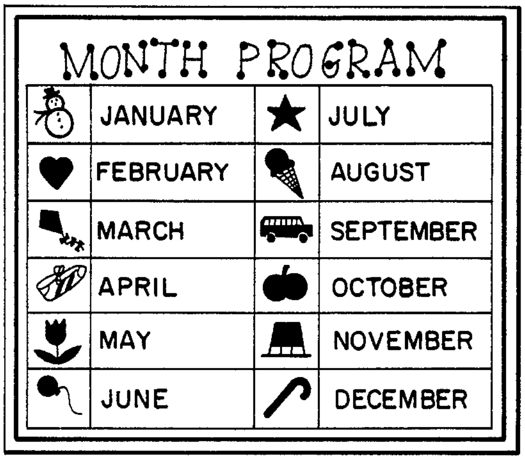
FIG. 2 is a chart illustrating designs or themes which may be associated with the stationery of each particular month.

The stationery associated with each month has associated therewith a specific design. For example, as is shown in FIG. 2, stationery for the month of January may be associated with snowmen, stationery for the month of June may have balloon designs associated therewith, stationery for the month of July may have stars associated therewith, stationery for October may have pumpkins associated therewith, etc.

Figure 3:
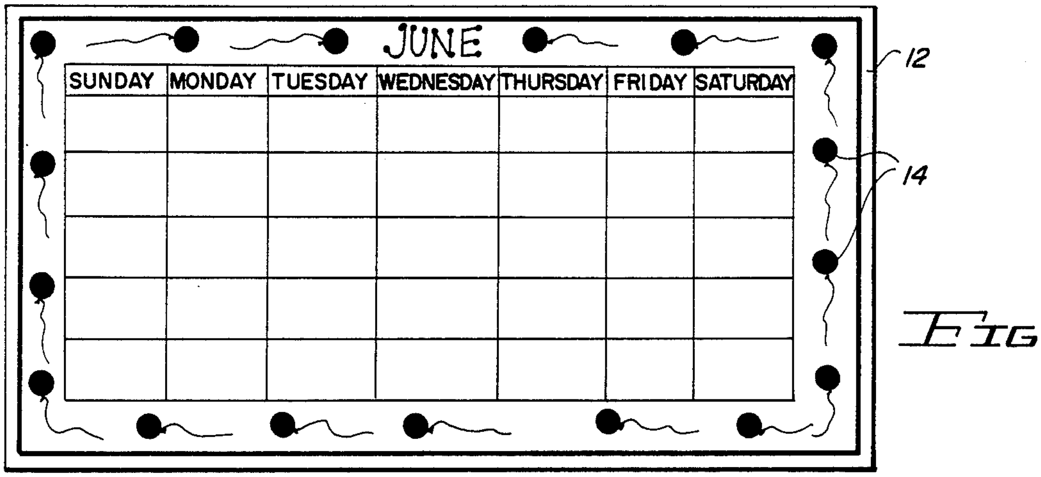
FIG. 3 illustrates one of the twelve calendars included in the inventive communication kit upon which the adult may indicate the important days of that month.

As stated previously, the kit includes a calendar for each month upon which the adult can indicate the important days of that month. One such calendar 12 shown in FIG. 3 for the month of June. As can be seen, the calendar is surrounded by a plurality of balloon designs 14 in accordance with the chart shown in FIG. 2.

Figure 4:
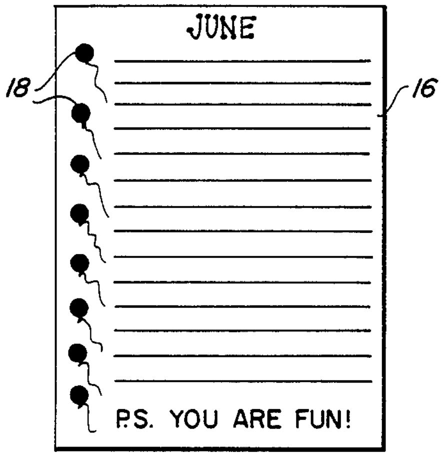
FIG. 4 illustrates letter stationery included in the inventive communication kit.

A letter 16 of the type shown in FIG. 4 is sent twice each month. Since the letter shown in FIG. 4 is one of the two letters that will be sent in the month of June (weeks one and three), it is decorated with balloon designs and has the name of the month (June) preprinted thereon. The letter provides ample space for a personal message or drawing on the front and back sides.

Figure 5:
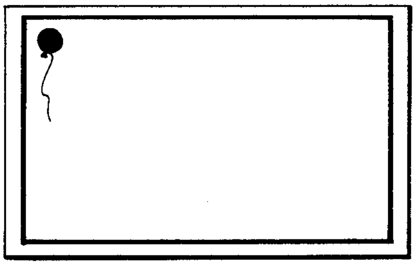
FIG. 5 illustrates small post cards included in the inventive communication kit which are to be returned to the adult by the child.

Along with each letter sent in the first and third weeks of each month, a small returnable preaddressed and prestamped post card of the kind shown in FIG. 5 is included which the child returns to the adult. This encourages return communications from the child to the adult which may eventually lead to a continuing habit of future communication to the adult. These post cards may be kept by the adult as a history of the child's growth. They may also promote conversation when the child and adult get together.

Figure 6:
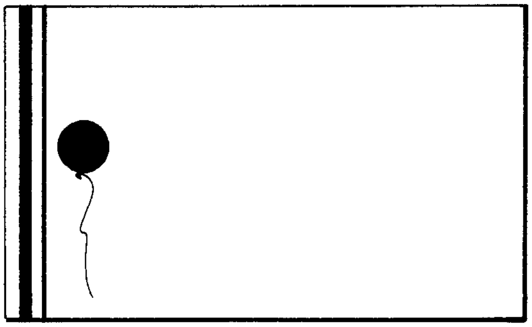
FIG. 6 illustrates format of the envelopes included in the inventive communication kit.

The small post cards along with all other items mailed in the first and third weeks are mailed in first and second envelopes respectively of the type shown in FIG. 6. As can be seen, both the small post card (FIG. 5) and the envelope (FIG. 6) are decorated with the design corresponding to the particular month in which they are sent (e.g., balloons for the month of June).

Figure 7:
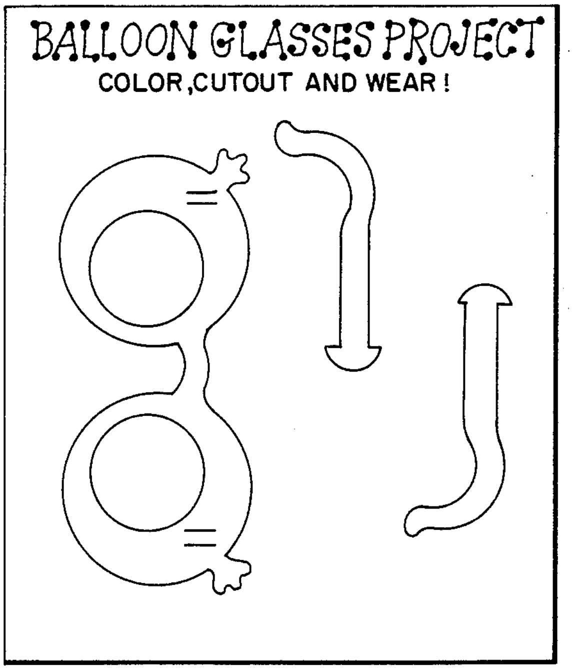
FIG. 7 illustrates one example of a special project included in the kit for forwarding to the child.

In the third week, a special project also accompanies the letter which the child may color, cut and assemble. For example, FIG. 7 illustrates a special project wherein balloon glasses may be colored, cut out, assembled and worn by the child during play. Thus, in this manner the adult provides the child with an activity each month which is fun for the child, is easy and is inexpensive. Other projects may include snowman paper dolls for January, heart book marks for February, a kite doorknob sign for March, a running shoe design for April on which the child can learn to tie his shoes, a school bus bank for September, a pumpkin mask for October, etc.

Figure 8:
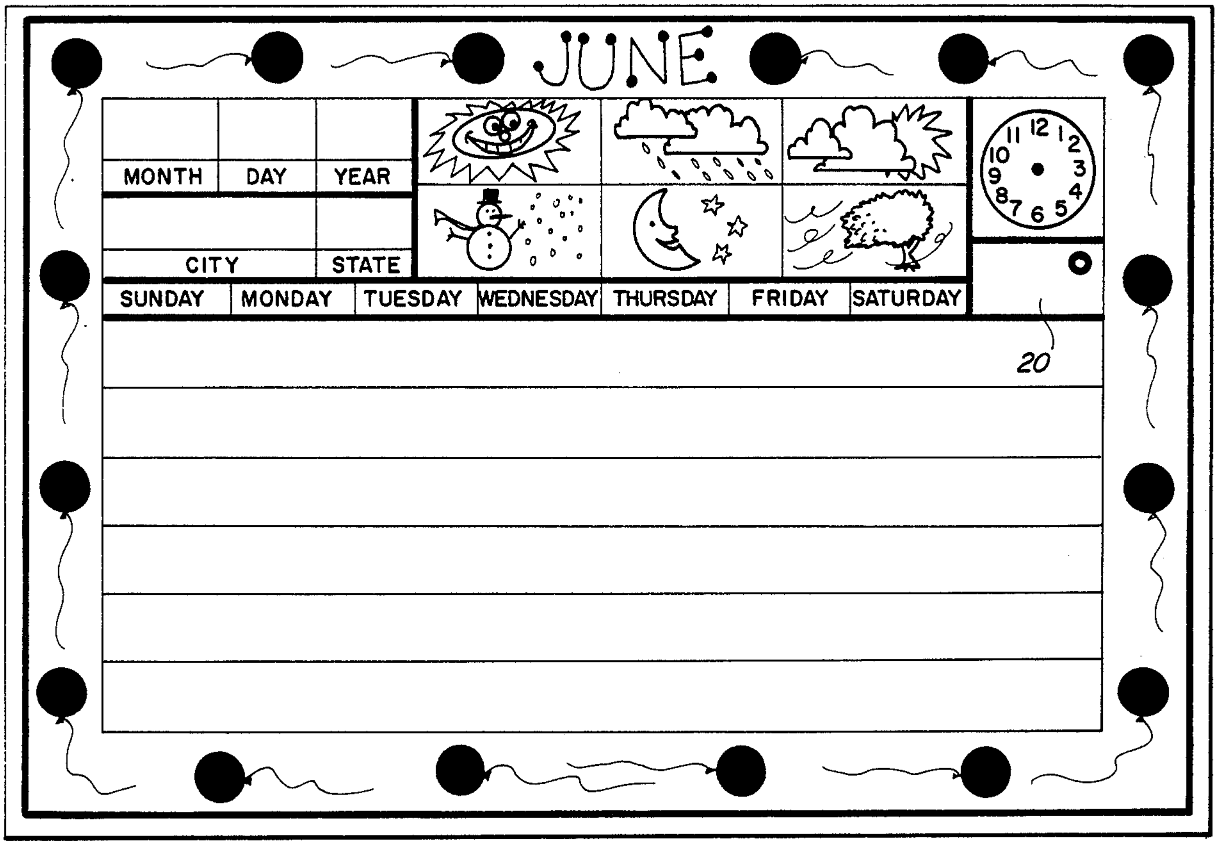
FIG. 8 illustrates format of the large post cards included in the kit.

Large post cards of the type shown in FIG. 8 are provided in the kit and are sent to the child during the second and fourth weeks of each month. As can be seen, the large post cards include spaces where the month, day, year, city and state may be filled in by the adult. The day of the week may be circled, and a check in the appropriate weather box will indicate the type of weather the adult is experiencing. The hands may be drawn in on the clock to indicate the time of day the card is being written, and a temperature block 20 is provided in which the temperature may be recorded. Finally, the large post card includes a writing area in which the adult may write a short message. The other side of the large post card shown in FIG. 8 may contain a map of the United States on which the adult may indicate where he lives and where the child lives. The location of other family members may also be indicated on the map. In short, the large post cards are designed to convey a short message to the child along with information about the adult's environment.

Figure 9:
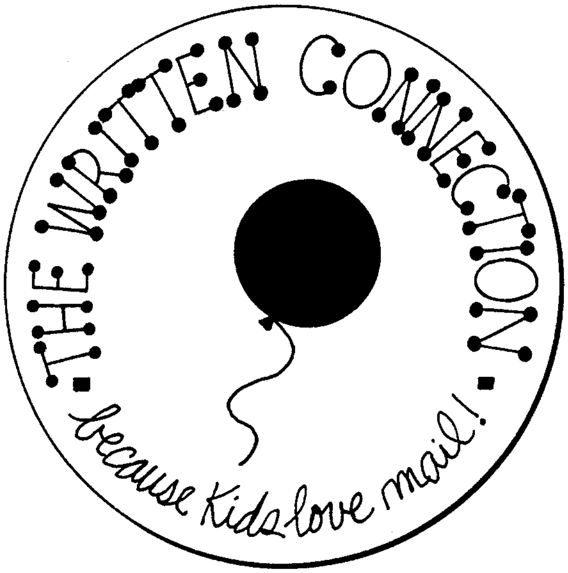
FIG. 9 illustrates one example of a sticker included in the kit for forwarding to the child.

Finally, FIG. 9 illustrates an example of a sticker which may be sent to the child along with the letters during the first and third weeks.

The above described communication kit substantially eliminates the frustrations regarding how to communicate with a child and results in improved communication and ultimately, a closer relationship. Furthermore, after the stationery for each month is used, the empty pocket in the folder may be used to collect the child's returned post cards, other drawings, school papers, photographs, etc. After collecting such items for a year, the folder can become an important keepsake which may be passed on to the child when he or she becomes older.

The above description is given by way of example only. Changes in form and details may be made by one skilled in the art without departing from the scope of the invention. For example, instead of sending stickers during the first and third weeks, balloons or other items could be sent. In addition, the designs associated with each month as shown in the chart in FIG. 2 may be replaced by a system of numbers, animals, careers, etc.

We claim:

1. A communication kit for organizing and encouraging postal communications between an adult and a child, said communication kit including a plurality of sets of stationery each tailored to a particular month and comprising:

a first plurality of items of stationery to be sent by said adult to said child at a first time of said particular month;

at least a first item of stationery to be sent by said adult to said child at a second later time of said particular month;

a second plurality of items of stationery to be sent by said adult to said child at a third still later time of said particular month; and at least a second item of stationery to be sent by said adult to said child at a fourth still later time of said month.

2. A communication kit according to claim 1 wherein each of said first and second pluralities of items further includes a returnable item of stationery which is sent by said adult to said child and is returned by said child to said adult.

3. A communication kit according to claim 2 wherein said returnable item is a return addressed, prestamped post card.

4. A communication kit according to claim 2 further comprising a chart which is retained by said adult for keeping track of communications between said adult and said child.

5. A communication kit according to claim 4 wherein the sets of stationery each bear design indicia thereon which is unique to a particular month.

6. A communication kit according to claim 4 wherein each of said first and second plurality of items includes a letter and an envelope.

7. A communication kit according to claim 6 wherein said first plurality of items includes a calendar upon which important dates of that particular month may be noted by said adult.

8. A communication kit according to claim 7 wherein said second plurality of items includes a special project which the child may perform.

9. A communication kit according to claim 8 wherein each of said first and second plurality of items includes a sticker.

10. A communication kit according to claim 8 wherein said at least first and second items are large post cards each including a space for a message and space for indicating details of the adult's environment.

11. A communication kit according to claim 10 wherein said first, second, third and fourth times correspond to the first, second, third and fourth weeks of each month.

12. A communication kit according to claim 10 wherein said kit includes twelve sets of stationery, one for each month of the year.

13. A communication kit for organizing and encouraging postal communications between an adult and a child, comprising:

- a plurality of sets of stationery each tailored to a particular month and including:
  - a first plurality of items of stationery to be sent by said adult to said child at a first time of said particular month;
  - at least a first item of stationery to be sent by said adult at a second later time of said particular month;
  - a second plurality of items of stationery to be sent by said adult to said child at a third still later time of said particular month;
  - at least a second item of stationery to be sent by said adult to said child at a fourth still later time of said month; and
  - a chart for keeping track of the communications between said adult and said child.

14. A communication kit according to claim 13 wherein each of said first and second pluralities of items further includes a returnable item of stationery which is sent by said adult to said child and is returned by said child to said adult.

15. A communication kit according to claim 14 wherein said returnable item is a return addressed, prestamped post card.

16. A communication kit according to claim 14 wherein the sets of stationery each bear design indicia thereon which is unique to a particular month.

17. A communication kit according to claim 14 wherein each of said first and second plurality of items includes a letter and an envelope.

18. A communication kit according to claim 17 wherein said first plurality of items includes a calendar upon which important dates of that particular month may be noted by said adult.

19. A communication kit according to claim 18 wherein said second plurality of items includes a special project which the child may perform.

20. A communication kit according to claim 19 wherein each of said items includes a sticker.

21. A communication kit according to claim 19 wherein said at least first and second items are large post cards each including a space for a message and space for indicating details of the adult's environment.

22. A communication kit according to claim 21 wherein said first, second, third and fourth times correspond to the first, second, third and fourth weeks of each particular month.

23. A communication kit according to claim 21 wherein said kit includes twelve sets of stationery, one for each month of the year.

* * * * *